United States Patent [19]

Uematsu

[11] Patent Number: 5,150,141
[45] Date of Patent: Sep. 22, 1992

[54] ELECTRIC DRIVE DEVICE FOR CAMERA

[75] Inventor: Kimio Uematsu, Tokyo, Japan

[73] Assignee: Nikon Corporation, Tokyo, Japan

[21] Appl. No.: 663,060

[22] Filed: Feb. 27, 1991

Related U.S. Application Data

[63] Continuation of Ser. No. 509,222, Apr. 16, 1990, abandoned.

[30] Foreign Application Priority Data

Apr. 19, 1989 [JP] Japan .................................. 1-99740
May 12, 1989 [JP] Japan ................................ 1-119862

[51] Int. Cl.⁵ ............................................. G03B 19/12
[52] U.S. Cl. .................................. 354/152; 354/242; 354/272
[58] Field of Search ............... 354/173.1, 173.11, 152, 354/153, 205, 206, 241, 242, 243, 244, 259, 260, 234.1, 271.1, 266, 272

[56] References Cited

U.S. PATENT DOCUMENTS 4,400,073 8/1983 Tosaka et al. ................. 354/205 X
4,775,583 10/1988 Kawamura ..................... 354/241 X Primary Examiner—L. T. Hix
Assistant Examiner—Khanh Dang
Attorney, Agent, or Firm—Shapiro and Shapiro

[57] ABSTRACT

An electric drive device for a camera, for driving a movable mirror and a lens diaphragm by a motor and also charging a shutter, comprises
  a shutter drive device for activating a focal plane shutter having curtains running along a predetermined plane for exposure control of film;
  a charging cam to be rotated in a first direction to actuate the shutter drive device thereby charging the focal plane shutter, or in a second direction for release of the shutter and exposure of the film;
  an electric motor having a driving shaft preferably perpendicular to the predetermined plane; and
  a transmission system for connecting the driving shaft of the electric motor with the charging cam.

33 Claims, 4 Drawing Sheets

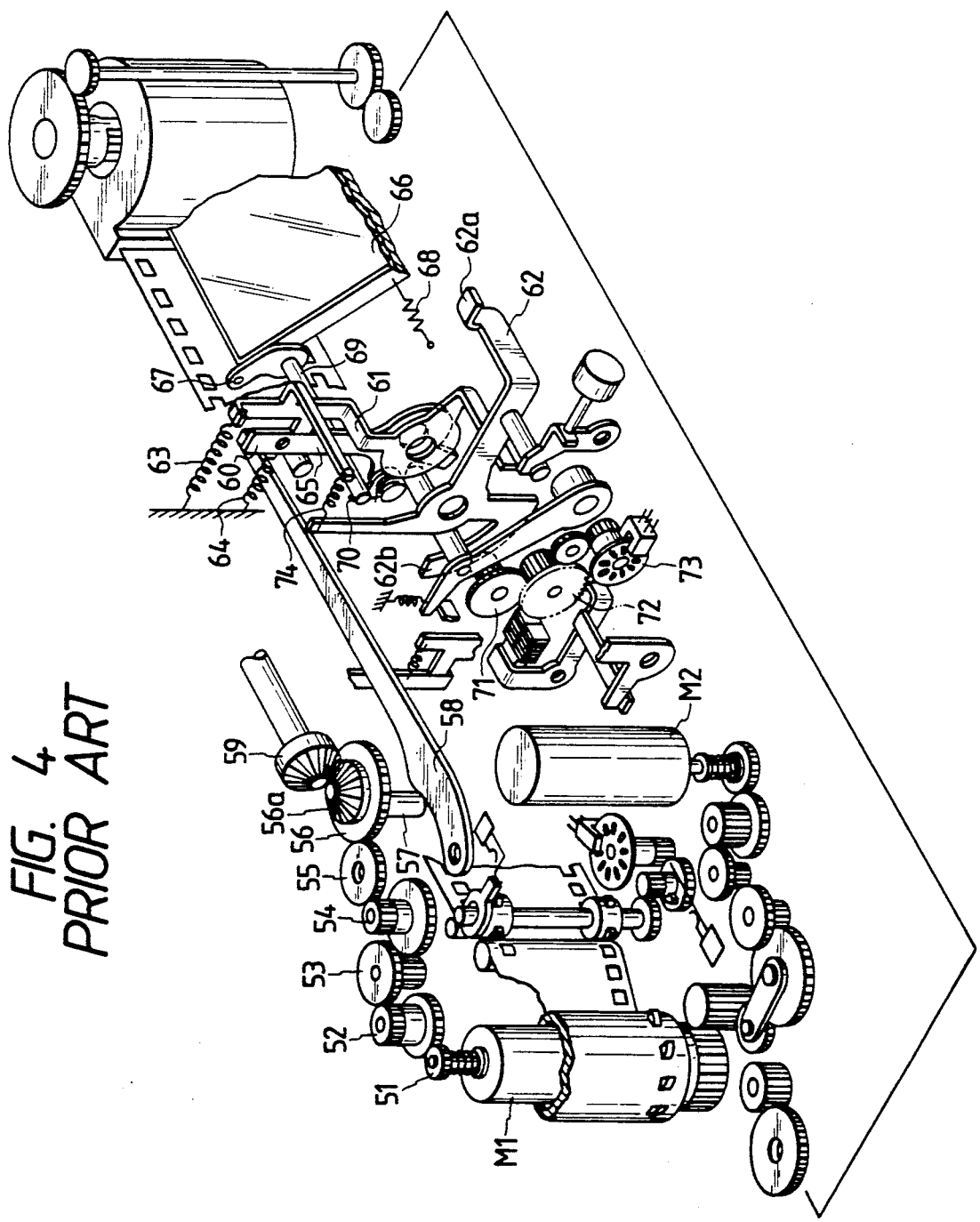

ELECTRIC DRIVE DEVICE FOR CAMERA

This is a continuation of application Ser. No. 509,222 filed Apr. 16, 1990, now abandoned.

BACKGROUND OF THE INVENTION

1. Field of the Invention

The present invention relates to an electric drive device for a camera, for driving a movable mirror and a lens diaphragm by a motor and also charging a shutter.

2. Related Background Art

FIG. 3 shows the general arrangement of a conventional driving mechanism of a camera.

A sequence motor M1 for driving the movable mirror and the lens diaphragm, and charging the shutter, is provided in a winding spool. Mechanisms linked with said motor M1 are provided in an upper space S1 at the film winding side of the camera, and in a space S2 at the side of the mirror box.

A film feeding motor M2 is also provided for winding and rewinding the film. A mechanism linked with said motor M2 is provided in a bottom space S3 of the camera.

FIG. 4 is a perspective view showing the above-explained driving mechanism in more detail.

At first there will be explained a mirror-up operation conducted by the rotation of the sequence motor in a first direction.

In response to the depression of a shutter button, the sequence motor M1 rotates clockwise. The rotation is transmitted through reducing gears 51 - 55 to a charging cam gear 56, which is thereby rotated anticlockwise.

At the lower end of said gear 56 there is fixed a mirror driving pin 57, which is in contact with a mirror driving lever 58, and which rotates said lever to the right (clockwise). An end of said lever 58 is rotatably supported by a sequence base plate (not shown), while the other end engages with a mirror driving vertical lever 60, thereby rotating said lever 60 to the right by the rotation of the charging cam gear 56.

On an unrepresented (i.e., not illustrated) plate constituting the mirror box, the mirror driving vertical lever 60, a diaphragm return lever 61 and a diaphragm lever 62 are fitted on a common shaft, (not shown) and are biased toward the left (anticlockwise) by springs 63, 64, toward a position of contact with an initial position setting pin 65.

A movable mirror 66 is, in said initial state prior to shutter releasing, positioned in front of the film plane, with an angle of 45° with respect to the photographing optical path.

Said movable mirror is rotatably supported by a rotary shaft at 67, and is biased clockwise by a mirror-down spring 68.

On a side of said mirror there is fixed a mirror driving pin 69, which protrudes in the moving trajectory of a lever 70 formed on an end of the mirror driving vertical lever 60.

The rotation of the mirror driving vertical lever 60 to the right in response to the shutter releasing operation pushes up said mirror driving pin 69, whereby the movable mirror 66 is lifted.

Also the diaphragm return lever 61 rotates clockwise together with said vertical lever 60. A diaphragm driving spring 74, provided between the diaphragm return lever 61 and the diaphragm lever 62, thus causes clockwise rotation of the diaphragm lever 62. An end 62a of said diaphragm lever 62 is in contact with a diaphragm lever of an unrepresented lens, so that the diaphragm aperture in said lens is gradually closed by the clockwise rotation of said diaphragm lever of the camera body.

Gear teeth provided on the other end 62b of the diaphragm lever 62 mesh, through an increasing gear 71, with a diaphragm controlling ratchet gear 72 and a diaphragm controlling encoder 73 to effect diaphragm control, in which the ratchet gear is stopped when an output corresponding to the preset diaphragm aperture value is obtained from the encoder.

The mirror-up operation is completed when the mirror driving pin 57 reaches an upper dead point with respect to the mirror driving lever 58 by anticlockwise rotation of the charging cam gear 56 by 90°, whereupon the sequence motor M1 is stopped.

Subsequently a mirror-down operation is initiated by the rotation of the sequence motor in a second direction. The reverse rotation of said sequence motor M1 is started upon detection of completion of shutter curtain movement corresponding to a predetermined shutter speed.

The clockwise rotation of the charging cam gear 56 moves the mirror driving lever 58 to the left, causes the descent of the movable mirror and the return of the diaphragm lever 62 to an open aperture position. Also in the course of said mirror-down operation, an unrepresented shutter is charged by a rotating shaft driven by bevel gears 56a, 59 through on the charging cam gear 56.

Subsequently the film feeding motor M2 is activated to advance the film, in order to prepare for the next phototaking operation.

In the conventional structure explained above, the mechanism for sequential control is divided into three parts, namely a part including the sequence motor M1 to the mirror driving cam (51 - 56, 58 etc.), another part providing the mirror driving mechanism (60, 69, 70 etc.), and still another part including the shutter charging cam drive (59 etc.) and a shutter charging control unit (not shown), are of which are accommodated in the spaces S1 and S2. As a result such conventional structure presents the following drawbacks:

1. An increased number of component parts, involving complicated mechanisms leading to poor assembling efficiency and increased cost;
2. Divided structures requiring a larger space, thus enlarging the dimensions of the camera itself; and
3. Direction of motors different from the final driving direction, requiring changes in direction and leading to a reduced efficiency.

In addition, motors of large power, which are not only bulky but also expensive, have been required.

SUMMARY OF THE INVENTION

A principal object of the present invention is to provide an electric driving device for a camera which avoids the aforementioned problems.

Briefly stated, as applied, for example, in a camera having a focal plane shutter and a movable mirror which is displaceable into and out of phototaking optical path, the invention provides a driving device for charging and releasing the shutter and for displacing the mirror, comprising a charging cam cooperable with an actuating member of said shutter and rotatable in a first direction on a rotation axis for displacing said actuating member to charge said shutter and in a second direction on said rotation axis for releasing said actuating member to enable release of said shutter, an electric motor having a drive shaft rotatable in opposite directions and rotatably drivingly coupled to said charging cam for rotating said charging cam in said first and second directions on said rotation axis, and mirror driving means mounted to said charging cam for displacement about said rotation axis with rotation of said charging cam and cooperable with a mirror displacement member for effecting displacement of said mirror out of said optical path with rotation of said charging cam in said second direction by said motor and for effecting displacement of said mirror into said optical path with rotation of said charging cam in said first direction by said motor.

According to one preferred implementation, the shutter charging cam and a movable mirror and diaphragm driving cam are provided on a common shaft, said charging cam being driven by the sequence motor, and said sequence motor being oriented with its drive shaft parallel to the rotation axis of said charging cam.

According to another preferred implementation, the charging cam and a charging gear of the shutter are connected by a link mechanism, with the moveable mirror and the diaphragm being driven by reciprocating motion of a link member driven by the sequence motor, and means are provided for stopping said sequence motor at the extremes of the reciprocating motion of the link member.

As will be appreciated from the detailed description hereinafter, the invention achieves a simpler and more compact structure of fewer parts, improved driving efficiency, and lower cost as compared with conventional structures.

BRIEF DESCRIPTION OF THE DRAWINGS

FIG. 4 is a perspective view of the conventional driving mechanism.

DESCRIPTION OF THE PREFERRED EMBODIMENTS

Figure 1:
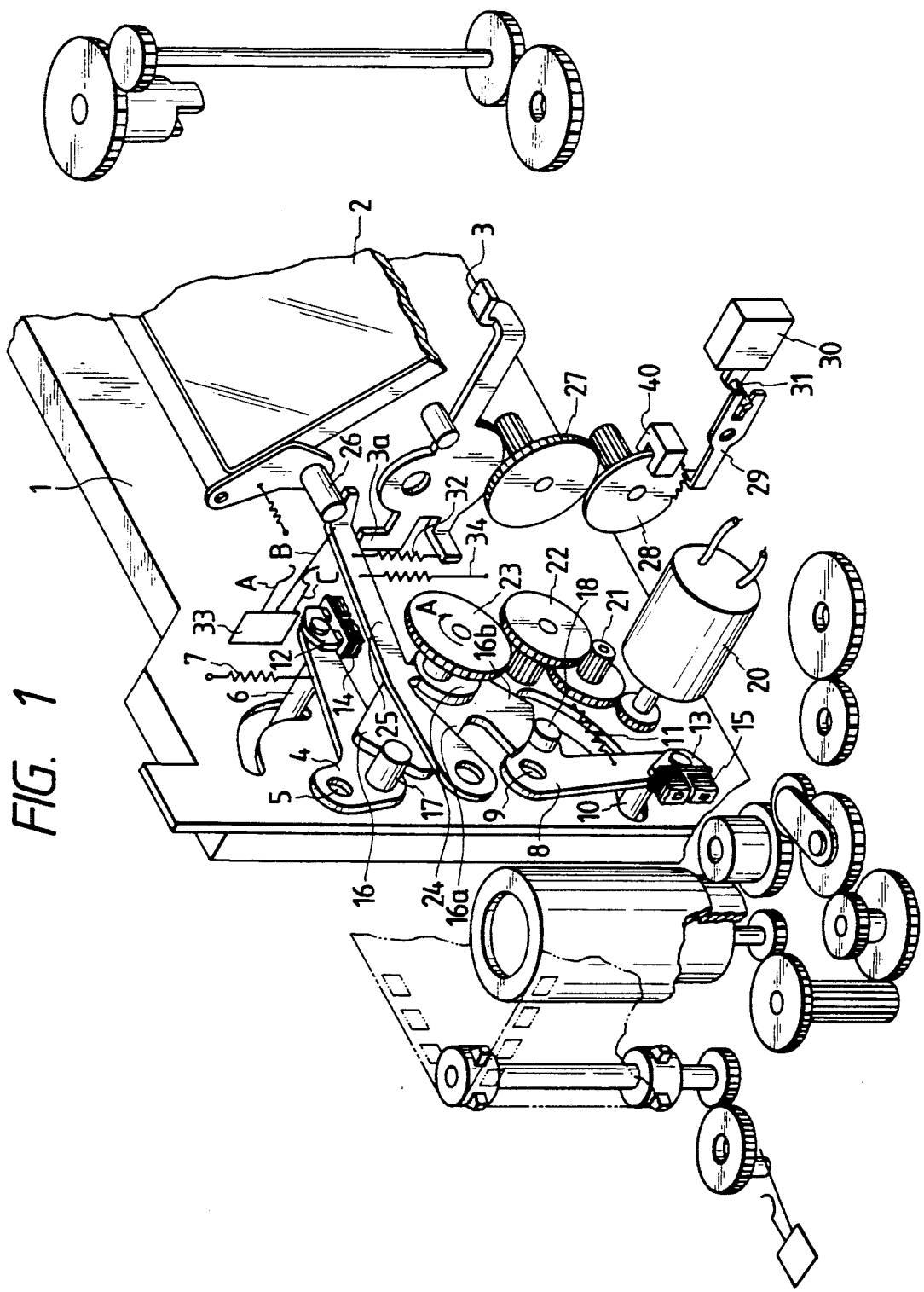
FIG. 1 is a perspective view of the electric driving device for a camera according to a first embodiment of the present invention.

FIG. 1 is a perspective view of the internal mechanisms in the vicinity of the focal plane shutter of a camera according to a first embodiment of the present invention, in a state prior to the shutter releasing operation.

In FIG. 1, the focal plane shutter 1 is in a charged state. A movable mirror 2 is in an initial position in front of the film plane, with an angle of 45° with respect to the phototaking optical path. Also the diaphragm (not shown) of a phototaking lens is maintained in an open state by a diaphragm lever 3.

Said focal plane shutter 1 is of a vertically running type, having two sets of shutter blades, in which each set is composed of two arms and plural shutter blades constituting multi-articulated links, and said two sets of shutter blades are vertically moved with a predetermined order to form a desired slit therebetween. For simplicity of illustration, the shutter construction has not been shown in detail in the drawing.

A leading curtain driving lever 4 is rotatably supported about a shaft 5, and a pin 6 provided on the end of said driving lever 4 is linked with an unrepresented arm, for driving the shutter blades of the leading curtain. A spring 7 providing the driving force biases said lever anticlockwise, and causes the upward motion of the shutter blades of the leading curtain at the shutter releasing operation.

A trailing curtain driving lever 8 is rotatably supported about a shaft 9, and a pin 10 provided on the end of said driving lever 8 is linked with an unrepresented arm for driving the shutter blades of the trailing curtain. A spring 11 providing the driving force biases said lever anticlockwise, and causes the upward motion, with a predetermined delay after the motion of the leading curtain, of the shutter blades of the trailing curtain.

Movable iron pieces 12, 13 are loosely fitted, with certain freedom, on the ends of the driving levers, in such a manner that they are in contact with attracting faces of attracting magnets 14, 15 in the state of completed shutter charging.

A charging cam 16, when rotated anticlockwise (illustrated in a state completely rotated anticlockwise), is in contact with rollers 17, 18 provided on said leading curtain driving lever 4 and said trailing curtain driving lever 8, thereby turning said levers clockwise and charging said driving springs 7, 11. The charging cam maintains said movable iron pieces 12, 13 in pressed state against the attracting faces of said magnets.

A sequence motor 20 is provided at the plane of a base plate of the focal plane shutter 1 in such a manner that the rotary shaft of said motor is perpendicular to said plane. Motor 20 is linked with a charging cam gear 23 integral with the charging cam through reducing gears 21, 22 having shafts parallel to said rotary shaft, thereby serving to charge the shutter and to drive the mirror and the diaphragm.

In response to the depression of an unrepresented shutter releasing button, said sequence motor 20 rotates anticlockwise, thereby turning the charging cam to the right. The shutter driving levers 4, 8 supported by the outermost protruding portions of the charging cam 16 are rendered movable upon the rotation of the charging cam, but said magnets 14, 15 are energized in synchronization with the shutter releasing operation, thereby attracting the movable iron pieces 12, 13 and maintaining the driving levers in the start position.

The charging cam 16 rotates over an angle of 1/4 turn, and is provided with recesses 16a, 16b for escaping, at the end of the rotation, from the moving paths of the rollers 17, 18 provided on said driving levers.

In front of said shutter charging cam, and integrally constructed therewith is a mirror driving cam 24, in contact with a swinging lever 25 for driving the mirror and the diaphragm.

Said swinging lever 25 is in contact with the lower dead point of the mirror driving cam 24 in the mirror-down state prior to the shutter releasing operation, and with the upper dead point of said cam upon a 1/4 turn of the cam after the shutter releasing operation is initiated.

The end of the swinging lever 25 engages with a driving pin 26 of the movable mirror 2 and an end 3a of the diaphragm lever 3. Thus, by the rotation of the mirror driving cam to the right after initiation of the shutter releasing operation, the swinging lever 25 rotates to the left, thereby lifting the movable mirror and rotating the diaphragm lever to the right, thus closing the diaphragm aperture in the lens.

The rotation of the diaphragm lever 3 is transmitted, through the increasing gears 27, to a ratchet gear 28 and a pulse encoder 40, and the aperture of the diaphragm is set by a stopping lever 29 at a predetermined diaphragm aperture upon counting of a corresponding number of pulses.

An end of the stopping lever 29 is linked with the vertically movable shaft of a bistable solenoid 30. In response to a stop signal, the shaft 31 is lowered to rotate the stopping lever 29 to the right, whereby the stopping lever 29 engages with the ratchet gear 28 to fix the aperture of the diaphragm.

The diaphragm lever, which has been biased by the swinging lever 25 and spring 32 and has integrally moved with said lever, is fixed by said engagement, whereby the swinging lever 25 alone further rotates, charging the spring 32 and lifting the movable mirror.

A motor stop switch 33, positioned at the end of the swinging lever, is closed by the contact of contact pieces A, B at the completion of lifting of the movable mirror. Upon detection of the thus generated signal, the sequence motor is stopped to terminate the mirror lifting operation.

With a certain delay thereafter, the leading and trailing curtain magnets 14, 15 are deactivated in succession, whereby the shutter driving levers are liberated to effect an exposure operation of a predetermined shutter speed.

Then, upon detection of a trailing curtain movement completion signal, the sequence motor starts reverse rotation thereby initiating the mirror-down operation The charging cam 16 is rotated to the left by said motor, and the swinging lever 25, which has maintained the mirror in the lifted state at the upper dead point of the mirror driving cam 24, is rotated to the right, thus lowering the movable mirror.

Also in response to said signal, a releasing signal is supplied to the bistable solenoid to shift the shaft 31 upwards, thereby disengaging the ratchet.

The diaphragm lever 3 is rotated to the left by the return spring 34 of the swinging lever with the rotation of the swinging lever to the right, thus returning the lens diaphragm to the open position.

At the same time, the rotation of the shutter charging cam 16 to the left causes the rotation of the leading and trailing curtain driving levers to the right, thereby charging the driving springs 7, 11. Also the exposure aperture is covered by the shutter blades of the leading curtain, and those of the trailing curtain are folded outside said aperture.

At the final stage of the mirror-down operation, in which descent of the mirror, opening of the diaphragm and charging of the shutter, are completed the motor stop switch is closed by the contact of contact pieces B, C to terminate the reverse rotation of the sequence motor.

A cycle of the sequence system is thus completed.

As will be apparent from a comparison with the earlier discussed conventional system, the first embodiment makes it possible to significantly reduce the number of component parts constituting the sequence system, thereby facilitating assembly, reducing the cost and realizing a more compact structure. These advantages are achieved by placing the sequence motor in the vicinity of the focal plane shutter, integrally constructing the charging cam for directly charging the shutter driving levers and the cam for driving the movable mirror and the diaphragm, and positioning said motor and said cams in as close a relationship as possible.

Also the close positioning of the driving source and the driven mechanism and the reduced number of linking members improve the driving efficiency, thereby reducing the required power of the motor and enabling the use of a smaller, less expensive motor.

Figure 2:
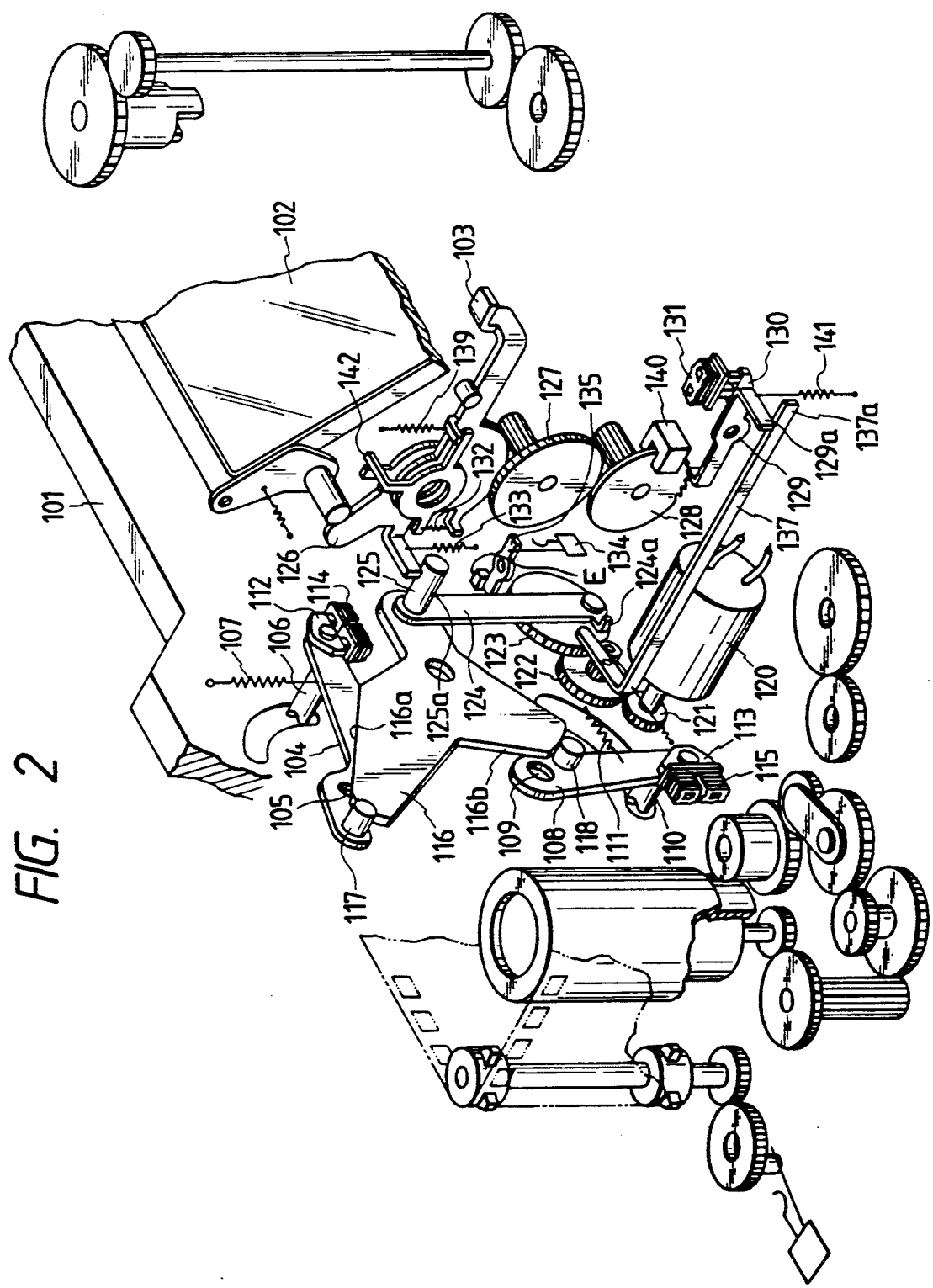
FIG. 2 is a perspective view of the electric driving device for a camera according to another embodiment of the present invention.
Figure 3:
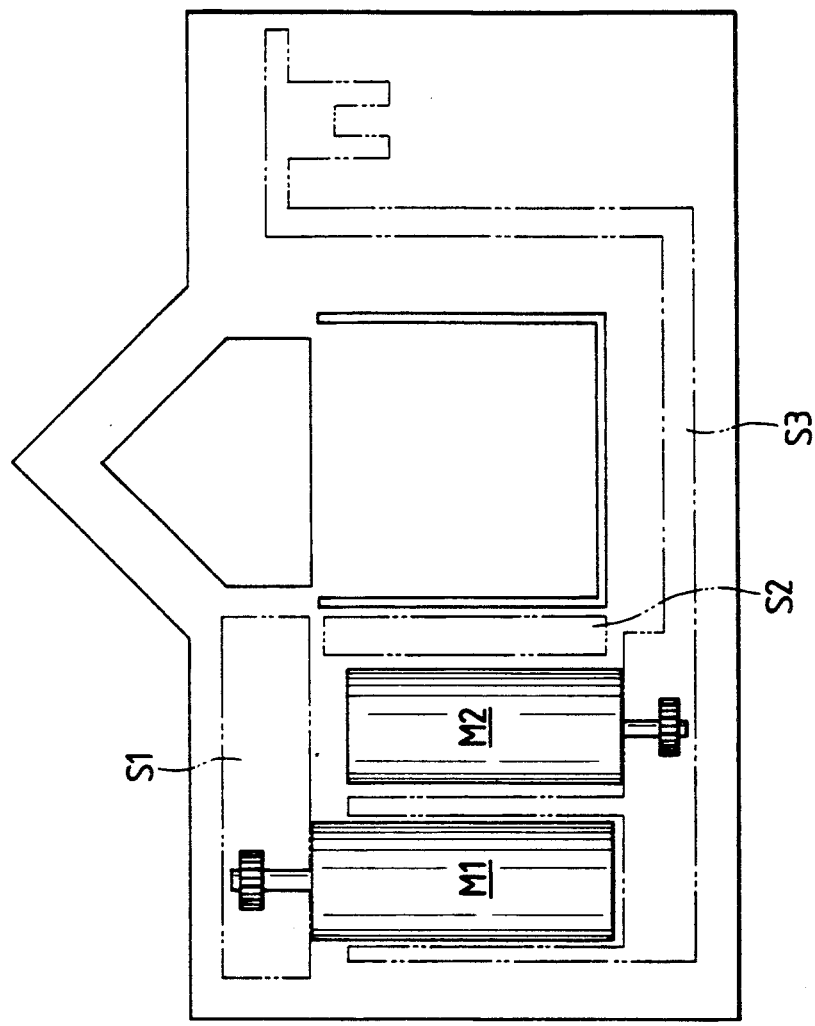
FIG. 3 is a diagrammatic view of a camera showing the general arrangement of a conventional driving mechanism.

FIG. 2 is a perspective view of the internal structure in the vicinity of the focal plane shutter in a camera according to a second embodiment of the present invention, in a state prior to the shutter releasing operation.

In FIG. 2, the focal plane shutter 101 is in a charged state. A movable mirror 102 is in an initial position in front of the film plane, with an angle of 45° with respect to the phototaking optical path. Also the diaphragm (not shown) of a phototaking lens (not shown) is maintained in an open state by a diaphragm lever 103.

The focal plane shutter 101 is of a vertically running type, having two sets of shutter blades, in which each set is composed of two arms and plural shutter blades constituting multi-articulated links, and said two sets of shutter blades are vertically moved with a predetermined order to form a desired slit therebetween. Again, for simplicity of illustration, the shutter construction has not been shown in detail.

A leading curtain driving lever 104 is rotatably supported about a shaft 105, and a pin 106 provided on the end of said driving lever 104 is linked with an unrepresented arm, for driving the shutter blades of the leading curtain. A spring 107 providing the driving force biases said lever anticlockwise, and causes the upward motion of the shutter blades of the leading curtain at the shutter releasing operation.

A trailing curtain driving lever 108 is rotatably supported about a shaft 109, and a pin 110 provided on the end of said driving lever 108 is linked with an unrepresented arm, for driving the shutter blades of the trailing curtain. A spring 111 providing the driving force biases said lever anticlockwise, and causes the upward motion, with a predetermined delay after the motion of the leading curtain, of the shutter blades of the trailing curtain.

Movable iron pieces 112, 113 are loosely fitted, with certain freedom, on the ends of the driving levers, in such a manner that they are in contact with attracting faces of attracting magnets 114, 115 in the state of completed shutter charging.

A charging cam 116, when rotated clockwise (illustrated in a state completely rotated clockwise), is in contact with rollers 117, 118 provided on said leading curtain driving lever 104 and said trailing curtain driving lever 108, thereby turning said levers clockwise and charging said driving springs 107, 111. The charging cam maintains said movable iron pieces 112, 113 in pressed state against the attracting faces of said magnets.

A sequence motor 120 is provided at the plane of a base plate of the focal plane shutter 101 in such a manner that the rotary shaft of said motor is perpendicular to said plane, and is linked with a charging cam gear 123 through reducing gears 121, 122 having shafts parallel to said rotary shaft, thereby serving to charge the shutter and to drive the mirror and the diaphragm.

The charging cam gear 123 is provided with a link member 124 linked with the charging cam 116, for transmitting the rotation of said charging cam gear 123 to the charging cam 116.

A mirror-up operation is initiated by the depression of an unrepresented shutter releasing button, whereby said sequence motor 20 rotates clockwise, thereby turning the charging cam gear 123 to the right. This rotation causes, through the link member 124, the charging cam 116 to rotate to the left. The shutter driving levers 104, 108 supported by the outermost protruding portions of the charging cam 116 are rendered movable by the rotation of said cam, but said magnets 114, 115 are energized in synchronization with the shutter releasing operation, thereby attracting the movable iron pieces 112, 113 and maintaining the driving levers in the start position.

The clockwise rotation of the charging cam gear 123 by 180° from the lower dead point to the upper dead point causes the rotation of the charging cam 116 by about 1/6 turn. Portions 116a, 116b of the charging cam 116 escape from the moving paths of the rollers 117, 118 of said driving levers 109, 108 at the end of said rotation.

A pin 125 fixed on an end of the charging cam 116 and rotatably supporting the link member 124 has a head portion 125a extended perpendicularly to the plane of the focal plane shutter 101 so as to be engageable with the mirror driving lever 126.

The rotation of the charging cam 116 to the left in the shutter releasing operation causes said pin 125 to rotate the mirror driving lever 126 to the right thereby lifting the movable mirror 102, and to also rotate the diaphragm lever 103 to right, thereby closing the diaphragm of the lens.

The rotation of the diaphragm lever 103 is transmitted, through increasing gears 127, to a ratchet gear 128 for detection by a pulse encoder 140. The aperture of the diaphragm is set by a stopping lever 129 at a predetermined diaphragm aperture upon counting of a corresponding number of pulses.

An end of said stopping lever 129 is provided with a movable iron piece 130, which is attracted to a permanent magnet of a combination magnet 131. The aperture of the diaphragm is set by energizing said magnet 131 by a stop signal, thereby cancelling the attracting force of said permanent magnet and causing the stop lever to rotate to the right under the bias of a spring 141 and to engage with the ratchet gear 128.

The mirror driving lever 126 and a diaphragm intermediate lever 142 rotate further, thus charging a spring 132 and lifting the movable mirror 102.

A stop switch 134 detects, through a detection lever 135, the rightward movement of the link member 124 in the vicinity of the upper dead point of the charging cam gear 123, thereby stopping the motor 120 and terminating the mirror-up operation.

With a certain delay thereafter, the leading and trailing curtain magnets 114, 115 are deactivated in succession, whereby the shutter driving levers are liberated to effect an exposure operation of a predetermined shutter speed.

Then, upon detection of a trailing curtain movement completion signal, the sequence motor 120 starts reverse rotation, thereby initiating the mirror-down operation.

The rotation of the sequence motor 120 to left causes the charging gear 123 to rotate to left, thus rotating the charging cam 116 to right through the link member 124, whereby the shutter driving levers 104, 108 are set in charging completed positions on cam faces of the cam 116 as shown in FIG. 2.

Also the pin 125, connecting the charging cam 116 with the link member 124, is lowered whereby the mirror driving lever 126, which has maintained the mirror 102 in the lifted state, is rotated to the left by the spring 133, thus causing the descent of said movable mirror 102 together with said pin 125.

In the course of said mirror-down operation, an end 124a of the link member 124 engages with a pendulum lever 137 to cause rotation thereof to right. An end 137a of said lever 137 is so positioned as to engage with a movable iron piece 129a of a diaphragm stop lever 129, whereby said lever 129 is rotated to the left to press the iron piece 130 to the attracting face of the combination magnet. The lever 129 is thus reset to the initial state.

The diaphragm lever 103 is rotated to the left by a spring 139, thus opening the lens diaphragm. At the end of the mirror-down operation, the link member 124 is slightly moved to the right in the vicinity of the lower dead point to rotate the detection lever 135 to the right, thereby actuating the switch 134 and stopping the sequence motor 120.

Behind the detection lever 135, there is provided an elastic member E for receiving the excessive rightward movement of the link member 124 in the vicinity of the upper and lower dead points, and said elastic member serves also as a brake for the rotation of the charge cam gear 123.

A series of functions of the sequence system is terminated by the stopping of the charging cam gear 123 at the lower dead point.

As will be apparent from a comparison with the earlier discussed conventional system, the second embodiment of the invention makes it possible to reduce the number of component parts constituting the sequence system, thereby facilitating assembly, reducing the cost and realizing a more compact structure. These advantages are achieved by connecting the charging cam gear with the charging cam for directly charging the shutter driving lever by means of a link mechanism, driving the movable mirror and the diaphragm by the reciprocating motion of the link member and stopping the sequence motor in response to movement of said link member to the upper or lower dead point.

Also the close positioning of the sequence motor and the driven mechanisms and the reduced number of linking members improve the driving efficiency, thereby reducing the required power of the motor and enabling the use of a smaller, less expensive motor.

What is claim is:

1. In a camera having a focal plane shutter and a movable mirror displaceable into and out of a phototaking optical path, an electric drive device for charging and releasing said shutter and for displacing said mirror, comprising:

an electric motor having a drive shaft rotatable in two directions, charging cam means rotatably drivingly coupled to said motor drive shaft and cooperable with an actuating member of said shutter, said charging cam means being rotatable in a first direction on a rotation axis in response to rotation of said motor drive shaft in one of said two directions for displacing said actuating member to charge said shutter and being rotatable in a second direction on said rotation axis in response to rotation of said motor drive shaft in the other of said two directions for releasing said actuating member to enable release of said shutter, and mirror driving means, including a drive member mounted to said charging cam means for displacement about said rotation axis with rotation of said charging cam means and cooperable with a mirror displacement member, for effecting displacement of said mirror out of said optical path through displacement of said drive member with rotation of said charging cam means in said second direction by said motor drive shaft and for effecting displacement of said mirror back into said optical path through displacement of said drive member with rotation of said charging cam means in said first direction by said motor drive shaft.

2. A device according to claim 1, wherein said motor drive shaft has a rotation axis perpendicular to said focal plane.

3. A device according to claim 2, wherein said mirror displacement member is cooperable with a diaphragm aperture adjustment member, whereby both mirror displacement and diaphragm aperture adjustment are effected through said mirror driving means.

4. A device according to claim 2, wherein said rotation axis of said charging cam means is parallel to said rotation axis of said motor drive shaft.

5. A device according to claim 4, wherein said shutter actuating member has a rotation axis parallel to said rotation axis of said motor drive shaft.

6. A device according to claim 4, wherein said drive member of said mirror driving means is a mirror driving cam mounted to said charging cam means and cooperable with said mirror displacement member.

7. A device according to claim 6, wherein said mirror driving cam is mounted for rotation on said rotation axis of said charging cam means.

8. A device according to claim 6, wherein said mirror displacement member is cooperable with a diaphragm aperture adjustment member, whereby both mirror displacement and diaphragm aperture adjustment are effected through said mirror driving cam.

9. A device according to claim 6, wherein said mirror displacement member has a rotation axis parallel to said motor drive shaft.

10. A device according to claim 4, wherein said drive member of said mirror driving means is a pin mounted to an eccentric portion of said charging cam means and cooperable with said mirror displacement member.

11. A device according to claim 10, wherein said motor drive shaft is drivingly coupled to said charging cam means as aforesaid through a link member having an end rotatably connected to said charging cam means.

12. A device according to claim 11, wherein said link member has said one end connected to said charging cam means said pin and another end rotatably supported on an eccentric portion of a charging cam gear driven through said motor drive shaft.

13. A device according to claim 12, wherein said mirror displacement member is cooperable with a diaphragm aperture adjustment member, whereby both mirror displacement and diaphragm aperture adjustment are effected through said pin.

14. A device according to claim 11, further comprising switch means cooperable with said link member for generating a signal to stop said motor on completion of charging of said shutter.

15. A device according to claim 10, wherein said mirror displacement member has a rotation axis perpendicular to said rotation axis of said motor drive shaft.

16. A device according to claim 4, wherein said motor drive shaft is drivingly coupled to said charging cam as aforesaid through a gear transmission.

17. A device according to claim 16, wherein said charging cam means is driven through a gear of said gear transmission which is mounted for rotation on said rotation axis of said charging cam means.

18. A device according to claim 16, wherein said charging cam is driven through a charging cam means gear of said transmission connected to said charging cam means through a link member, said charging cam gear having a rotation axis parallel to said rotation axis of said motor drive shaft.

19. A device according to claim 18, wherein said link member has one end rotatably supported on an eccentric portion of said charging cam gear and another end rotatably supported on an eccentric portion of said charging cam means.

20. A device according to claim 19, wherein said drive member of said mirror driving means is a pin rotatably connecting said another end of said link member to said eccentric portion of said charging cam means and cooperable with said mirror displacement member.

21. A device according to claim 16, wherein all gears of said transmission have rotation axes parallel to said rotation axis of said motor drive shaft.

22. A device according to claim 4, wherein said focal plane shutter has a base plate parallel to said focal plane, said motor drive shaft is disposed substantially at said base plate, and said charging cam means is rotatably supported on said base plate by a shaft.

23. In a camera having a focal plane shutter and a movable mirror displaceable into and out of a phototaking optical path, an electric drive device for charging and releasing said shutter and for displacing said mirror, comprising:
an electric motor rotatable in a first direction and in a second direction,
shutter driving means for operating said shutter to expose a film,
mirror driving means for displacing said mirror into and out of said phototaking optical path, and
cam means including a charging cam cooperative with said shutter driving means for charging said shutter and a mirror driving cam cooperative with said mirror driving means for driving said mirror driving means,
said cam means being responsive to rotation of said motor in said first direction for releasing the cooperation of said charging cam and said shutter driving means to enable operation of said shutter to expose the film, and for actuating said mirror driving means with said mirror driving cam to displace said mirror out of said phototaking optical path,
said cam means being responsive to rotation of said motor in said second direction for restoring the cooperation of said charging cam with said shutter driving means to charge said shutter, and for actuating said mirror driving means with said mirror driving cam to return said mirror into said phototaking optical path.

24. A device according to clam 23, wherein said charging cam sets said shutter driving means in an initial position and charges a driving spring of said shutter with the rotation of said motor in said second direction.

25. A device according to claim 23, wherein said charging cam and said mirror driving cam are coaxially integrally provided.

26. A device according to claim 23, wherein said mirror driving means is cooperable with a diaphragm aperture adjustment member, whereby both mirror displacement and diaphragm aperture adjustment are effected through said mirror driving means.

27. A device according to claim 23, wherein said mirror driving cam is mounted for rotation on a rotation axis of said charging cam.

28. In a camera having a focal plane shutter and a movable mirror displaceable into and out of a phototaking optical path, an electric drive device for charging and releasing said shutter and for displacing said mirror, comprising:

an electric motor rotatable in a first direction and in a second direction, shutter driving means for operating said shutter to expose a film, mirror driving means for displacing said mirror into and out of said phototaking optical path, charging cam means including a charging cam cooperative with said shutter driving means for charging said shutter, and transmission means including a gear rotatable by said motor and a pivotal link member coupling said gear with said charging cam and with said mirror driving means for transmitting a driving force from said motor to said charging cam and said mirror driving means, said transmission means being responsive to rotation of said motor in said first direction for actuating said charging cam means through said link member to release the cooperation of said charging cam and said shutter driving means to enable operation of said shutter to expose the film, and for actuating said mirror driving means through said link member to displace said mirror from said phototaking optical path, said transmission means being responsive to rotation of said motor in said second direction for actuating said charging cam means through said link member to restore the cooperation of said charging cam with said shutter driving means to charge said shutter, and for actuating said mirror driving means through said link member to return said mirror into said phototaking optical path.

29. A device according to claim 28, wherein said link member has one end connected to said charging cam and another end rotatably supported on an eccentric portion of said gear.

30. A device according to claim 28, wherein said mirror driving means comprises a pin mounted to an eccentric portion of said charging cam and a mirror displacement member cooperating with said pin to drive said mirror.

31. A device according to claim 30, wherein said mirror displacement member is cooperable with a diaphragm aperture adjustment member, whereby both mirror displacement and diaphragm aperture adjustment are effected through said pin.

32. A device according to claim 28, further comprising switch means cooperable with said link member for generating a signal to stop said motor on completion of charging of said shutter.

33. A device according to claim 29, further comprising switch means cooperable with said link member at first and second dead points of movement of said link member, said switch means generating a signal to stop said motor in response to completion of charging said shutter when said link member is at one of said dead points, said switch means generating a signal to stop said motor in response to displacement of said mirror from said phototaking optical path when said link member is at the other of said dead points.

* * * * *